United States Patent [19]

Selway et al.

[11] Patent Number: 5,745,742
[45] Date of Patent: Apr. 28, 1998

[54] APPARATUS FOR COORDINATING CLOCK DISTRIBUTION IN A FULLY REDUNDANT COMPUTER SYSTEM

[75] Inventors: David W. Selway, Phoenix; David A. Bowman, Glendale; Donald R. Kesner; James H. Phillips, both of Phoenix, all of Ariz.

[73] Assignee: Bull HN Information Systems Inc., Billerica, Mass.

[21] Appl. No.: 574,804

[22] Filed: Dec. 19, 1995

[51] Int. Cl.[6] .................................................... G06F 1/10
[52] U.S. Cl. ........................................................... 395/556
[58] Field of Search .................................... 395/180, 181, 395/182.01, 182.05, 182.09, 185.08, 200.19, 551, 553, 555, 556

[56] References Cited

U.S. PATENT DOCUMENTS

| | | | |
|---|---|---|---|
| 4,644,498 | 2/1987 | Bedard et al. | 395/182.01 |
| 5,467,466 | 11/1995 | Carlson | 395/556 |
| 5,594,896 | 1/1997 | Carlson | 395/556 |

*Primary Examiner*—Thomas M. Heckler
*Attorney, Agent, or Firm*—J. S. Solakian; J. H. Phillips

[57] ABSTRACT

A redundant computer system including two systems capable of independent operation. The two systems correspondingly employ two independent clock generation and distribution (CGD) units which each issue clock and clock definer signals. When the two systems are split, each system is controlled by the clock and definer signals generated by its own CGD unit. When the two systems are merged, one CGD unit is designated as master, and its clock and definer signals drives both sides of the redundant system. Special logic included in each CGD unit ensures that the change from master to slave (or slave to master) operation is performed without error. This special logic includes circuitry which places a temporary hold at a predetermined logic level on the local clock and definer signals, which are in use when the switch is made, when the local clock and definer signals are both at the predetermined logic level. The hold continues until the clock and definer signals which are to "take over" are also at the predetermined logic level.

9 Claims, 8 Drawing Sheets

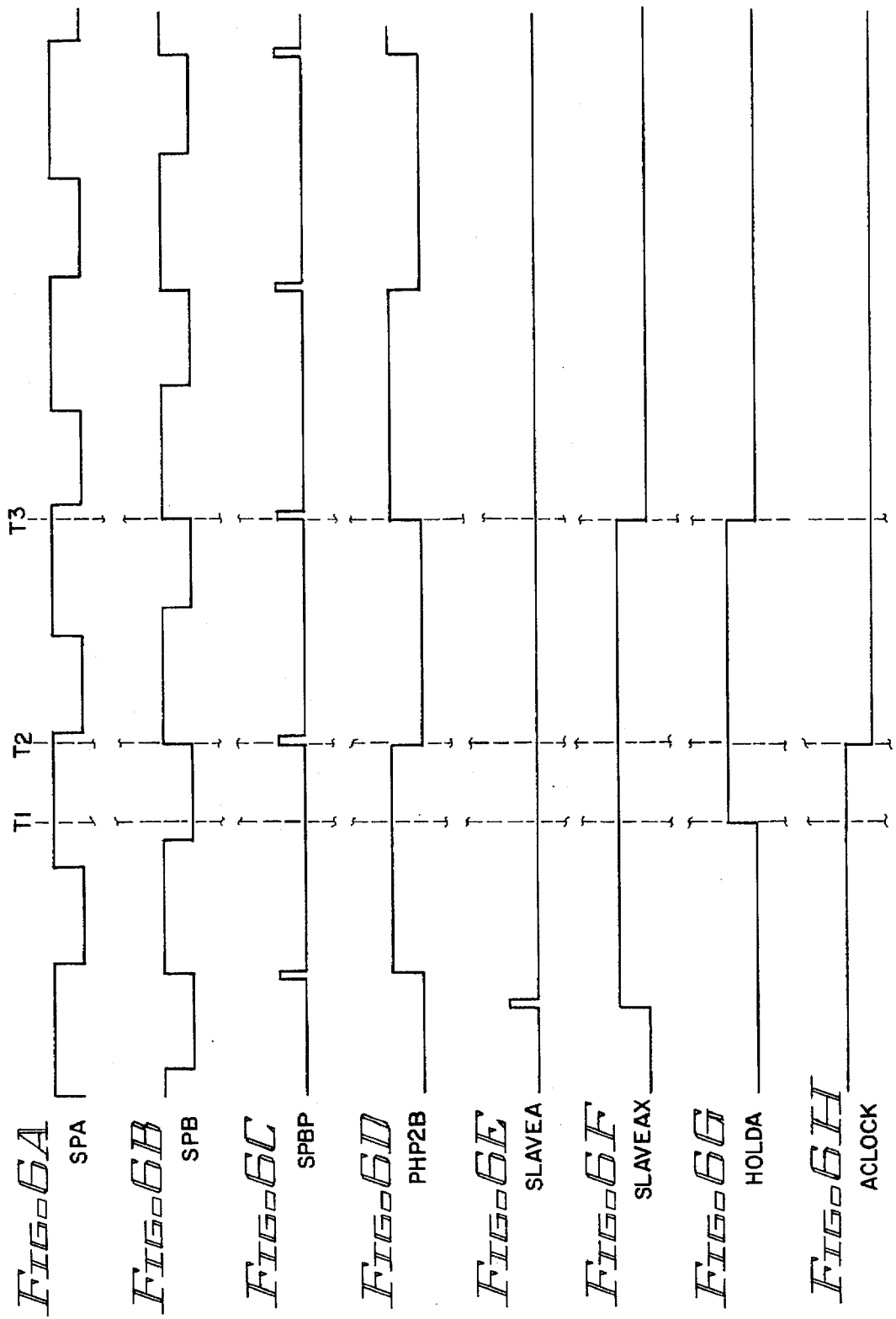

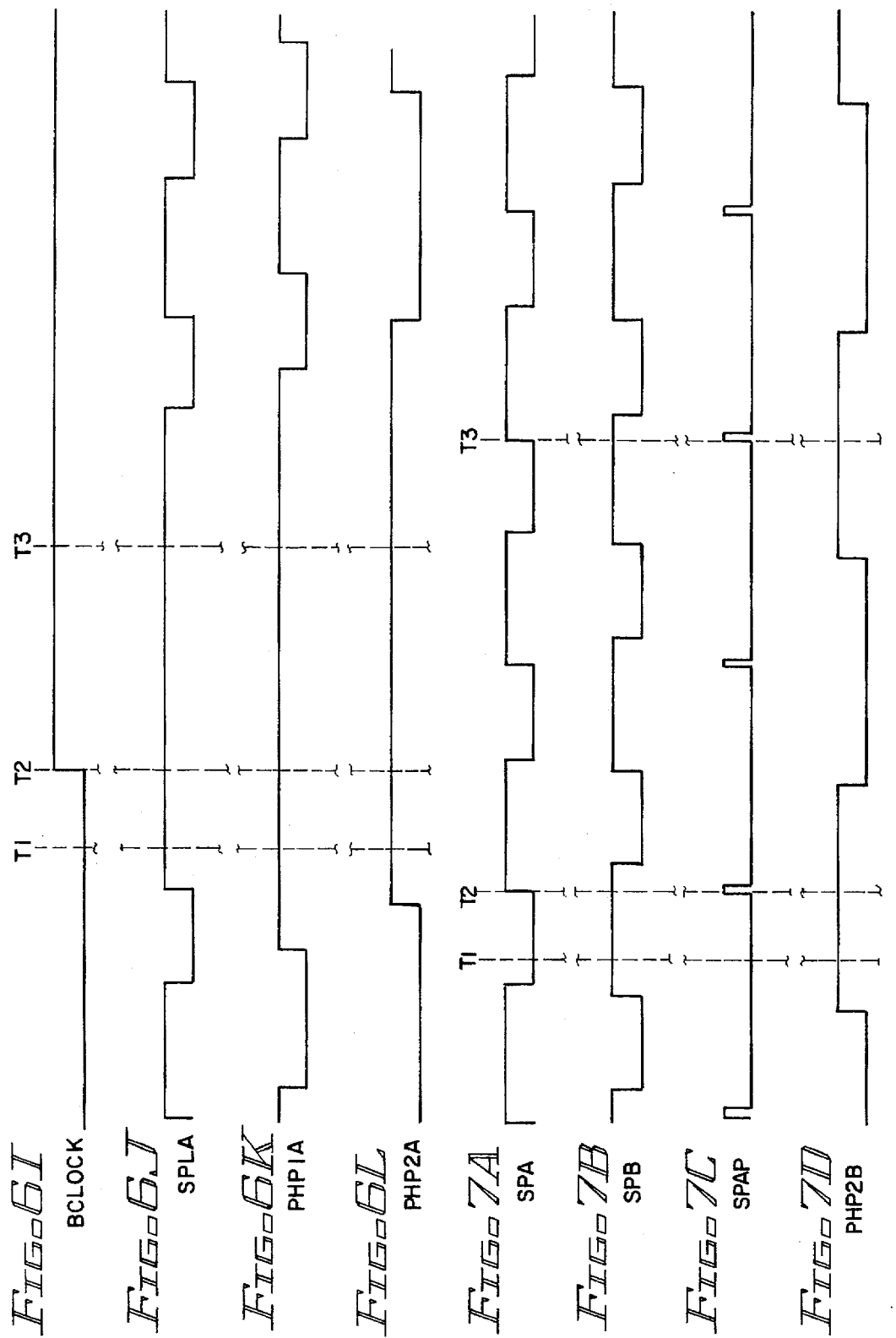

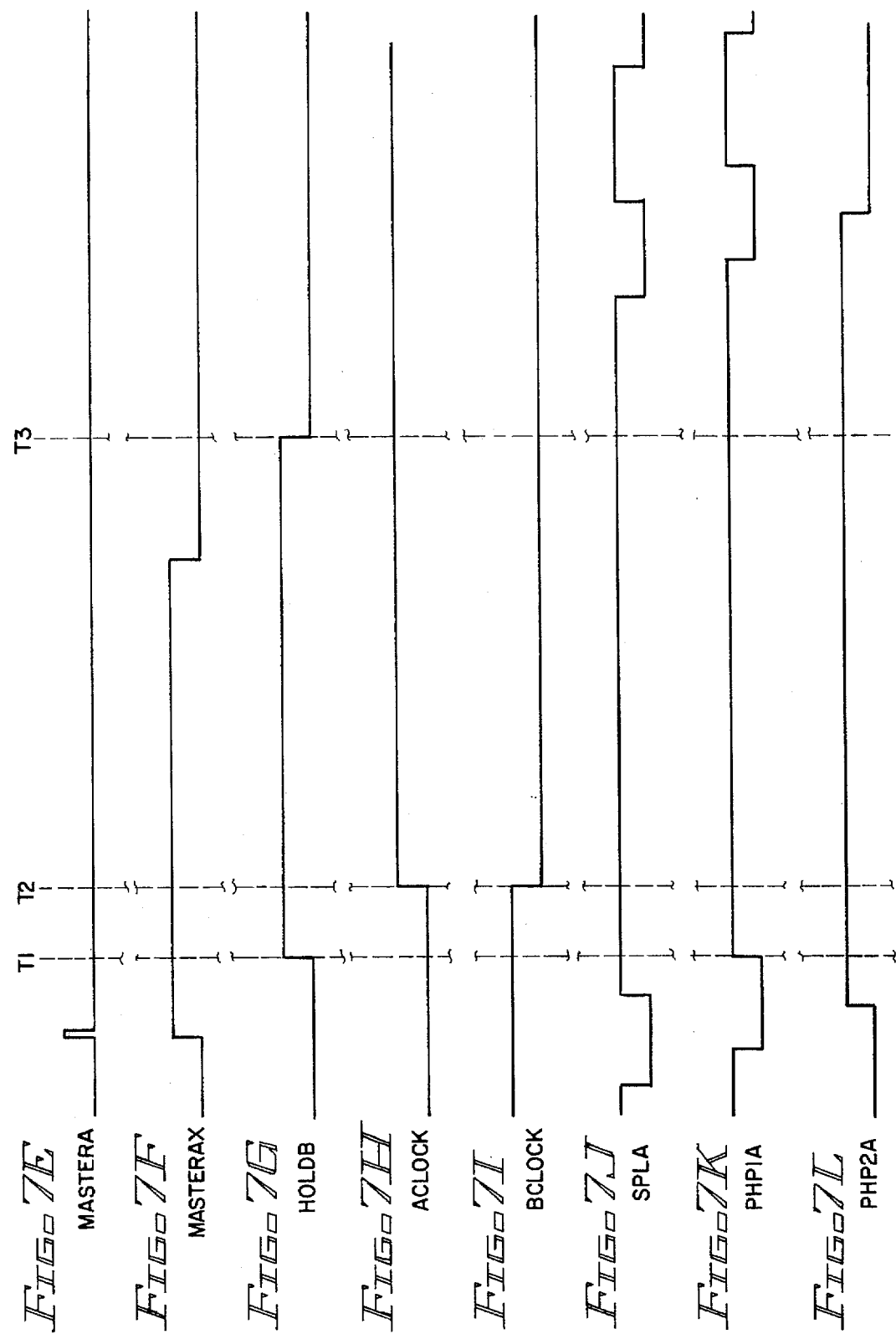

APPARATUS FOR COORDINATING CLOCK DISTRIBUTION IN A FULLY REDUNDANT COMPUTER SYSTEM

FIELD OF THE INVENTION

This invention relates to the art of computer hardware and, more particularly, to insuring compatibility between two clock generating and distribution components during a merge of redundant computer systems.

BACKGROUND OF THE INVENTION

Some computer applications call for a high degree of system integrity, and various approaches have been taken to ensure that a system can continue to perform even in the event of failure of a key component. One such approach is to provide a fully redundant system in which each system component is duplicated, thus effecting two systems, each capable of operating independently, comprising the redundant system. There are distinct advantages to this approach including the fact that, in effect, the power of a tandem system is available for use during normal, failure-free operation. Further, if a component failure should take place, it may be, and usually is, possible to continue operation with a tolerable decrease in performance. The degree of adverse effect on overall system performance from such a failure depends, of course, on which component fails in a given case.

One source of problems which arises in implementing a fully redundant system is found in the necessity to integrate redundant clock generation and distribution (CGD) units into the redundant system. During normal operation, the redundant system operates under a rationalized clock basis. For example, one of the CGD units may operate in a "master" mode and source the clocks for both systems. If a component in one of the systems fails, the redundant system may be split such that the other system can continue operation under control of its own CGD unit while repairs are made to the failed system.

Once repairs have been made to the failed system, it may be tested operating under control of its own CGD unit. However, after its integrity has been confirmed, the two systems must be capable of being remerged on-the-fly. A similar condition exists on routine startup of the redundant system. Both of these related tasks may be complicated by such factors as instantaneous phase differences between the two clock sets, slight frequency differences between the two governing oscillators, slight differences in delays inherent in the physical and electrical displacements between the two CGD units, etc. It is to the solution of all these and other related problems that the present invention is directed.

OBJECTS OF THE INVENTION

It is therefore a broad object of this invention to provide improved clock generation and distribution units in a fully redundant computer system.

It is a more specific object of this invention to provide such improved clock generation and distribution units in which the difficulty of rationalizing differences between the outputs of the two clock generating and distribution units, during a merge of the two systems after a repair to one or during system startup or under other conditions in which the systems have been operating independently and must be merged, is overcome.

SUMMARY OF THE INVENTION

Briefly, these and other objects of the invention are achieved, in a redundant computer system made up of two computer systems each capable of independent operation, by employing two independent clock generation and distribution (CGD) units which each issue clock and clock definer signals. When the two systems are split, each system is controlled by the clock and definer signals generated by its own CGD unit. When the two systems are merged, one CGD unit is designated as master, and its clock and definer signals drive both sides of the redundant system. Special logic included in each CGD unit ensures that the change from master to slave (or slave to master) operation is performed without error. This special logic includes circuitry which places a temporary hold or freeze, at a predetermined logic level, on the local clock and definer signals which are in use when the switch is made when the local clock and definer signals are both at the predetermined logic level. The hold continues until the clock and definer signals which are to "take over" are also at the predetermined logic level.

DESCRIPTION OF THE DRAWING

The subject matter of the invention is particularly pointed out and distinctly claimed in the concluding portion of the specification. The invention, however, both as to organization and method of operation, may best be understood by reference to the following description taken in conjunction with the subjoined claims and the accompanying drawing of which:

FIGS. 6A–6L are timing diagrams illustrating the relationships among various signals during the transition from master to slave operation; and FIGS. 7A–7L are timing diagram illustrating the corresponding relationships among the various signals during the transition from slave to master operation.

DESCRIPTION OF THE PREFERRED EMBODIMENT(S)

Figure 1:
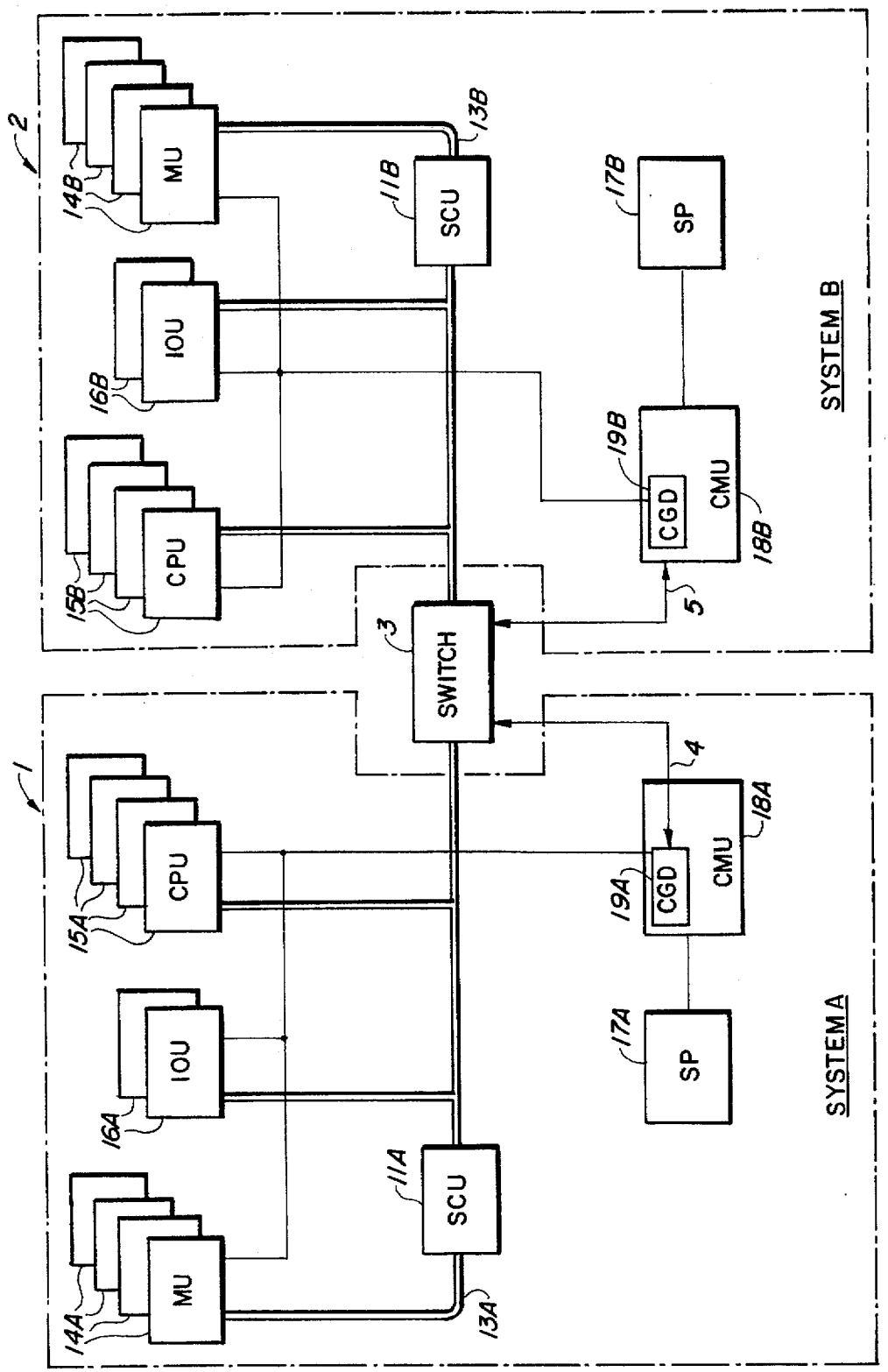
FIG. 1 is a high level block diagram of an exemplary fully redundant computer system effecting an environment in which the present application finds use.

Attention is first directed to FIG. 1 which illustrates an exemplary redundant computer system within which the subject invention may be incorporated and practiced. The redundant computer system may conveniently be separated into system A 1 and system B 2 with the addition of switch 3.

Referring specifically to system A 1, a System Control Unit (SCU) 11A centralizes and controls the scheduling of a system bus 12A and a memory bus 13A. More particularly, the SCU 11A: a) performs memory control including single bit error correction and double bit error detection; b) controls the memory configuration of which there are one per Memory Unit (MU) 14A; c) manages 64-byte block transfers between Central Processing Units (CPUs) 15A and the MUs in conjunction with a store-into-cache feature of the CPUs; d) corrects single bit errors found in modified blocks of a CPU's cache or on a data transfer from a CPU, MU or an input/output Unit (IOU) 16A; and e) contains the system calendar clock.

The system bus 12A interconnects one or more CPUs 15A and one or more IOUs 16A with each other and with the SCU 11A. In the exemplary environment, the system bus includes a 16-byte bi-directional data interface, a bi-directional address and command interface, an SCU status interface monitored by all CPUs and IOUs, and a small number of control lines between the SCU and each individual CPU and IOU. Data is exchanged on the system bus in 16, 32 or 64-byte groups, and data exchanges can be between a CPU and an MU, an IOU and an MU, first and second CPUs and a CPU and an IOU. The operations through the system bus 2A are: a) read: 16, 32 or 64 bytes; c) read with exclusivity: 64 bytes; d) write from IOU: 16, 32 or 64 bytes; e) write from CPU (swapping): 64 bytes; and f) interrupts and connects; —read/write registers.

Every system bus operation consists of an address phase and a data phase, and an address phase can start every two machine cycles. Consecutive 16-byte data transfers within a group can occur on consecutive machine cycles. An IOU 16A or a CPU 15B can wait for the data phase of up to two requests at the same time. The data blocks are transferred in the same order as the requests are received.

The memory bus 13A interconnects one or more MUs 14A with the SCU 11A. In the example, the memory bus includes a 16-byte bi-directional data interface, an address and command interface from the SCU to all MUs and a small number of control lines between the SCU and each individual MU. Data is exchanged on the memory bus in 16, 32 or 64-byte groups. The operations through the memory bus 3 are: a) read: 16, 32 or 64 bytes; and b) write: 16, 32 or 64 bytes.

The main memory of system A 1 is composed of one or more MUs 14. A single bit correction, double bit detection code is stored with every double word; i.e., eight code bits for every 72 data bits. The code is arranged so that a four-bit error within a single chip is corrected as four single bit errors in four different words. Data in an MU 14A is addressed from the SCU 11A in 16 byte (four word) increments. All bytes within any one MU are consecutively addressed; i.e., there is no interlace between MUs which operate in parallel. A memory cycle may start every machine cycle, and a memory cycle, as seen from a CPU 15A, is ten machine cycles, assuming no conflicts with other units. An exemplary MU 14A contains 160 Dynamic Random Access Memory (DRAM) circuits (not shown), each of which has n by four bit storage elements where n =256, 1024 or 4096.

The IOUs 16A each provide a connection between the system bus 2A and one or more I/O subsystems, not shown in FIG. 1.

A Clock and Maintenance Unit (CMU) 18A generates, distributes and tunes the clock signals for all the units in system A 1, provides the interface between a service processor (SP) 17A and the central processing, input/output and power subsystems, initializes the units of system A and processes errors detected within the various units in system A. Included within the CMU 18A is a clock generating and distribution (CGD) unit 19A which is a key element in the present invention and will be discussed in more detail below. Clock information is distributed from the CGD unit to the other units so system A 1 via clock bus 20A.

SP 17A may be a commodity personal computer with an integrated modem for facilitating remote maintenance and operations. (Large systems may include two SPs through which the system can be dynamically reconfigured for high availability.) The SP performs four major actions: a) monitors and controls system A 1 during initialization, error logging and diagnostic operations; b) serves as the primary operating system console during system A boot or on operator command; c) serves as console and data server for the input/output subsystems Maintenance Channel Adapter (not shown in FIG. 1); and d) provides a remote maintenance interface.

With respect to system B 2, units corresponding to those in system A 1 are denoted with a "B" suffix; i.e.: SCU 11B, system bus 12B, memory bus 13B, MUs 14B, CPUs 15B, IOUs 16B, SP 17B, CMU 18B and CGD 19B. Thus, it will be understood that systems A 1 and B 2 effect a redundant computer system when integrated by certain coupling structure represented by switch 3 which couples the system busses 12A and 12B. In addition, CGD unit 19A and CGD unit 19B are coupled to one another via line sets 4, 5 and the switch 3 as will be described more fully below.

Figure 2:
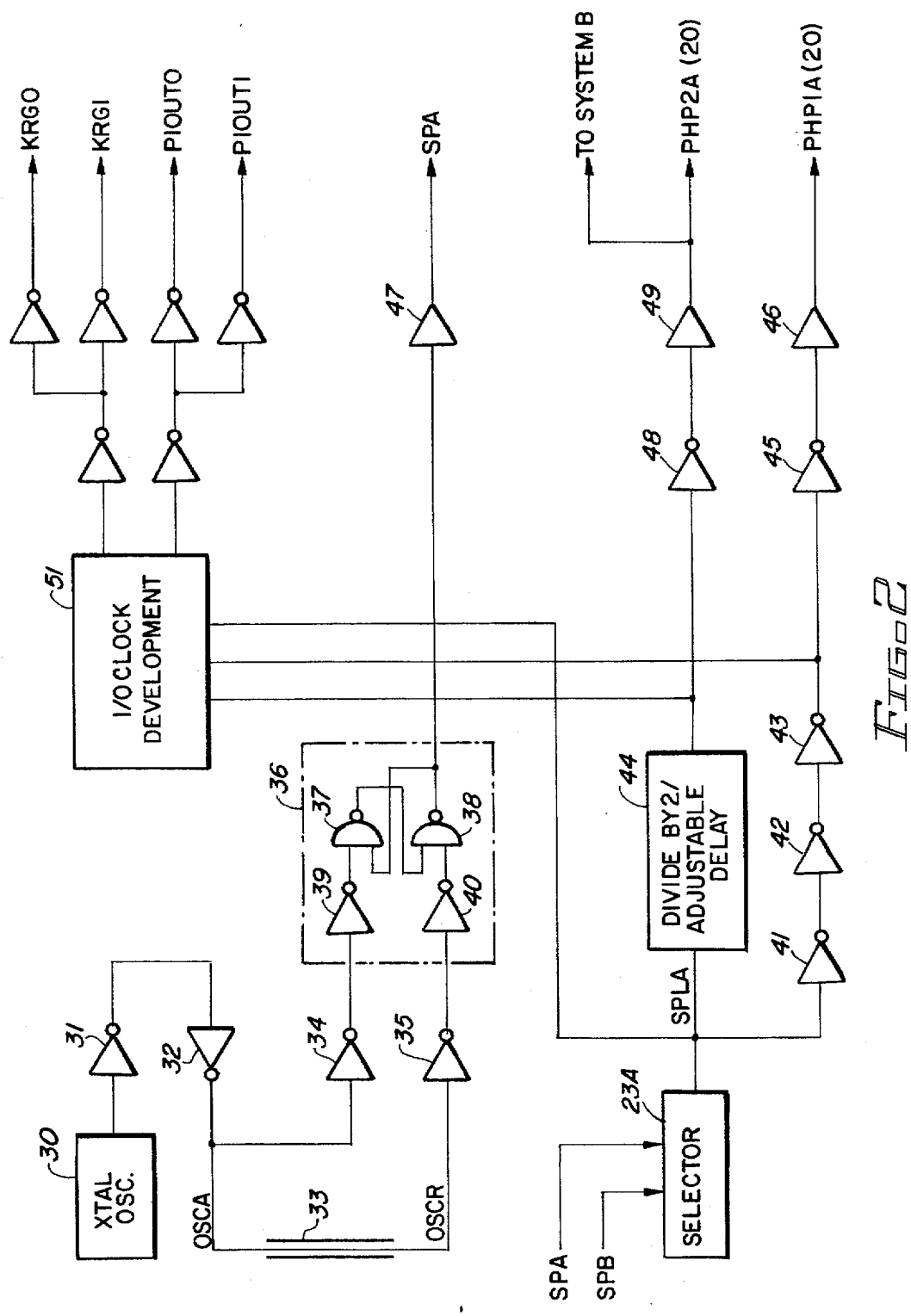
FIG. 2 is a simplified schematic diagram of a clock generation and distribution unit included in each system making up the redundant system.

Attention is now directed to FIG. 2 which illustrates an exemplary CGD unit; e.g., CGD unit 19A. Reference may also be taken to FIGS. 3A–3E which show waveforms of various signals in the CGD unit. The basic timing element in the CGD unit is a crystal oscillator 30 which drives a squaring-up circuit, typically a Schmitt trigger, 31 which issues a square wave at the oscillator frequency, 57.14 MHZ in the specific example. The output from squaring-up circuit 31 drives a constant impedance buffer 32, the output of which is designated OSCA, and the waveform of which shown in FIG. 3A. OSCA is applied to the input of a delay line 33 which issues OSCR, a signal retarded from, but otherwise identical to, OSCA by seven nanoseconds in the example.

Figure 3:
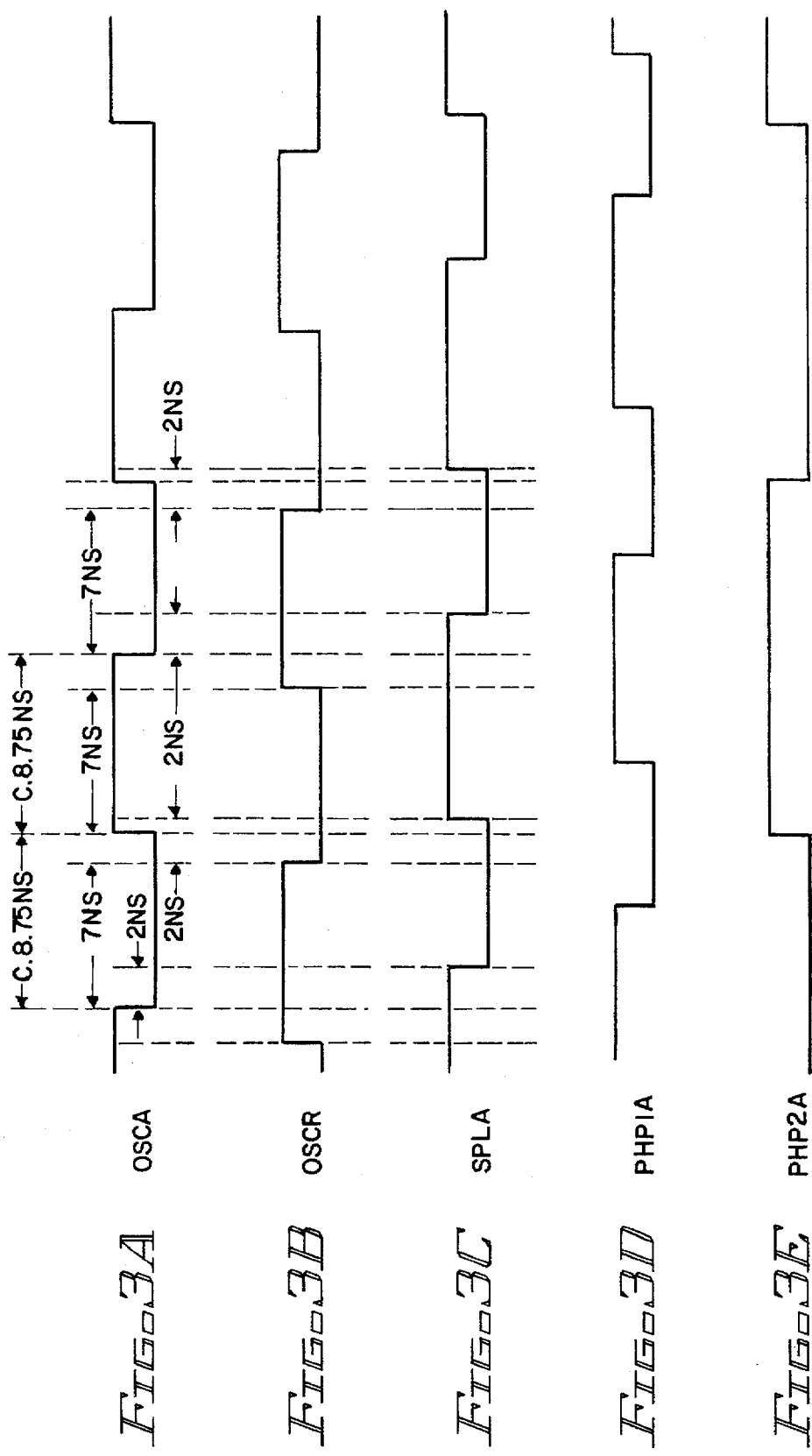
FIGS. 3A–3E are waveform diagrams illustrating the relationships among various signals of the logic circuitry illustrated in FIG. 2.

The signal OSCA is also applied to the input of an inverter 34, and the signal OSCR is also applied to the input of another inverter 35. The inverters 34, 35 drive a waveshaper circuit 36 which includes a pair of cross-coupled NAND-gates 37, 38. Inverter 34 drives inverter 39 which, in turn, drives the second input to NAND-gate 37. Similarly, inverter 35 drives inverter 40 which, in turn, drives the second input to NAND-gate 38. The output signal SP from the waveshaper circuit 36 is taken from the output of NAND-gate 38, and SP is also shown in FIG. 3. There is an inherent delay of about two nanoseconds from the inputs to the inverters 34, 36 and the outputs of the NAND-gates 37, 38.

The temporal relationships among the signals OSCA, OSCR and SP may best be understood from FIGS. 3A, 3B and 3C. At the exemplary oscillator frequency of 57.14 MHZ, each cycle of OSCA is about 17.5 nanoseconds, and the full cycle period of OSCR is the same, but retarded by seven nanoseconds. Both OSCA and OSCR are nominally symmetrical; i.e., their "up" and "down" logic level periods are about equal, c.8.75 nanoseconds in the example. However, it will be observed that SP is not symmetrical, and this is a result of the development in the waveform shaper 36 by which the trailing edge of SP follows by about two nanoseconds (the nominal delay through the waveshaper 36 and the inverters 34, 35) the trailing edge of OSCA while the leading edge of SP trails by about two nanoseconds the trailing edge of OSCR which, itself, trails the trailing edge of OSCA by the seven nanoseconds delay through delay line 33. Thus, the "down" time of SP is about seven nanoseconds, and the "up" time of SP is the remaining time in a basic clock cycle as established by the oscillator 30, i.e., about 10.5 nanoseconds in the example.

The signal SP is applied to the input of three serially-connected inverters 41, 42, 43 through which a certain amount of delay is obtained. The output from inverter 43 is designated PHP1. The signal SP is also applied to logic block 44 in which it is frequency divided by two to obtain signal PHP2. In addition, the frequency division process renders PHP2 symmetrical, which characteristic is used to advantage as will be discussed more fully below. Logic block 44 also includes an adjustable delay by which the signals PHP2 may be precisely adjusted with respect to PHP1 during system setup in the manner well known in the art.

PHP1 is applied to the input of an inverter 45 which drives inverting amplifier 46. Amplifier 46 thus issues PHP1 to several boards in system A (which carry the CPUs, SCU, IOUs, MUs) on the clock bus 20A as shown in FIG. 1. In the example, twenty copies of PHP1 is sent to other system components in system A 1. Similarly, PHP2, a symmetrical, half-frequency, time-displaced evolution of PHP1, is applied to the input of an inverter 48 which drives inverting amplifier 49. Amplifier 49 thus issues PHP2 to several boards in system A. In addition, PHP1 and PHP2 are respectively applied to inputs to constant impedance buffers 47, 50, respectively, to obtain the signals PHP1A and PHP2A which are sent to CGD unit 19B of system B 2 via switch logic block 3 as shown in FIG. 1.

Referring to FIGS. 3D and 3E the relationship of PHP1 (A) and PHP2(A) (as adjusted during system calibration) will be readily understood. PHP1(A), as previously noted, is asymmetrical (being a delayed replica of SP), and it is the main system "clock". However, various events take place in the system on the leading or trailing edge of the logic "1" state of PHP1(A) and, in many instances, it is necessary to know which of two succeeding logic "1" PHP1 (A) clock states should cause an event to occur; i.e., it is necessary to have available the equivalent of a two-phase clock. This is achieved by defining alternate logic "1" "phases" of PHP1 (A) by the state of PHP2(A). Thus, PHP2(A) is aligned to temporally "bracket" the PHP1(A) pulses such that a given PHP1(A) logic "1" pulse is defined as "phase 1" by a logic "1" PHP2(A) half cycle, and the next succeeding PHP1(A) logic "1" pulse is defined as "phase 2" by a logic "0" PHP2(A) half cycle. For this reason, PHP2(A) is referred to as a "definer".

Figure 4:
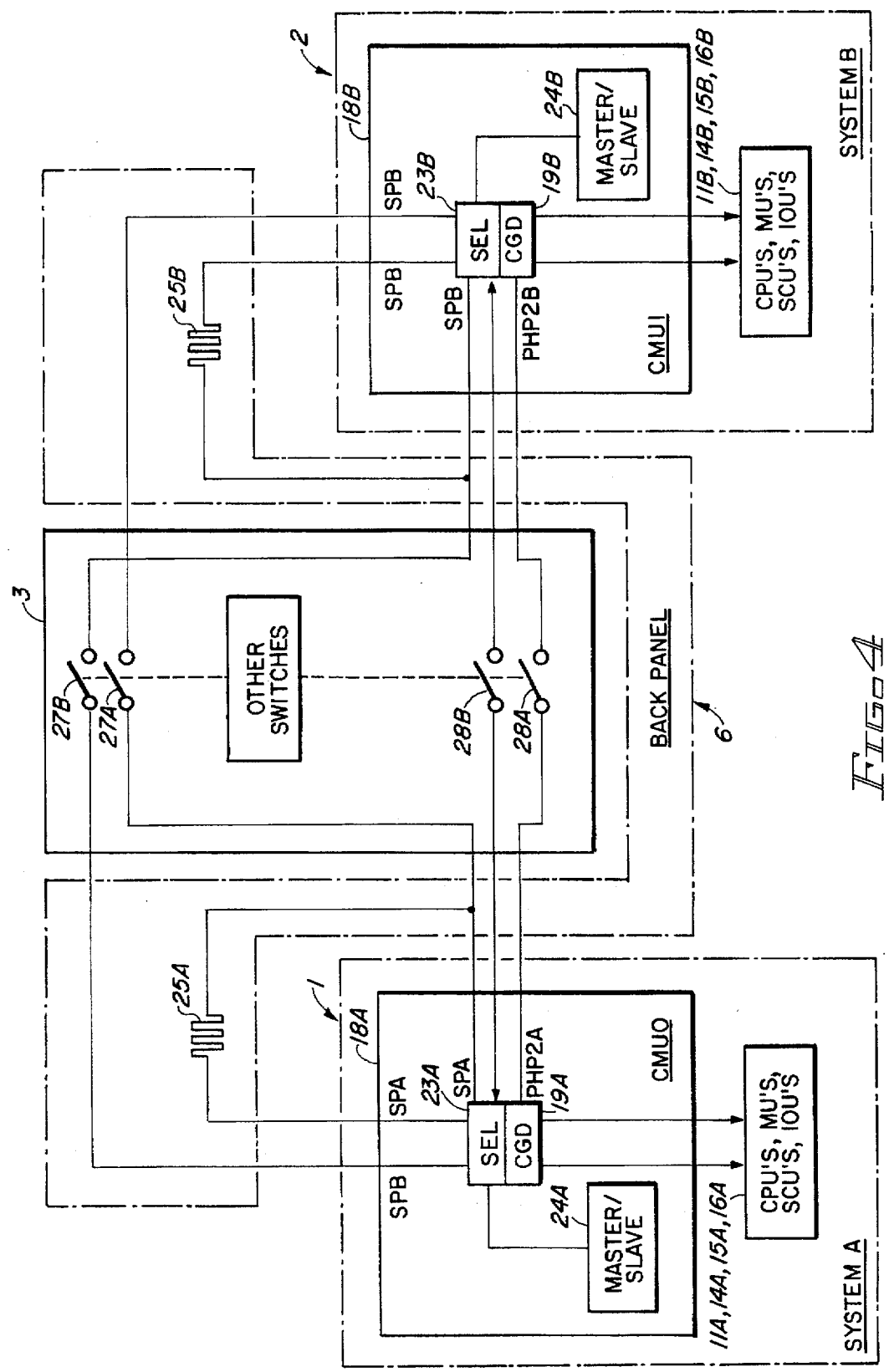
FIG. 4 is a high level block diagram illustrating the inter-relationship between the respective clock generation and distribution units in the two systems making up the redundant system.

Referring to FIG. 4, the relationship between the CMU0 18A of System A 1 and the corresponding CMU1 18B of system B 2 may be understood. For purposes of explanation, these two CMU units are considered to be substantially identical such that their descriptions may be partially combined.

Thus, CMU0 18A and CMU1 18A, 18B each include a CGD unit 19A, 19B which has been previously described in conjunction with FIG. 3. As previously discussed, each CGD unit 19A, 19B sends clock and definer signals to its own system components and also to the CMU of the other system via switch logic 3. More particularly, for example, the CGD unit 19A of system A sends clock and definer signals to the selector circuit 23A through a delay line 25A. In addition, the CGD unit 19A also sends clock and definer signals to the selector logic 23B of CMU1 18B via delay line 26A and switch 27A in the switch logic 3. It will be understood, of course, that the switch 27A has as many electronic contact sets as necessary to convey the clock and definer signal sets from the CGD 19A to the selector 23B.

Similarly, the clock and definer signals generated in CGD unit 19B are coupled, via delay line 25B, to its local selector logic 23B and also, via delay line 26B and through switch array 27B, to the selector logic 23A of CMU0 18A. Master/slave select circuit blocks 24A, 24B connected, respectively, to selector logic blocks 23A, 23B are employed to determine, manually or automatically, which set of clock and definer signals are to be employed in each system and distributed to the CPUs 11A, 11B; MUs 14A, 14B; SCUs 15A, 15B and IOUs 16A, 16B.

Assume, merely for purposes of illustration, that the redundant system is operating such that each of system A 1 and system B 2 is employing its own internal clock; i.e., switch arrays 27A, 27B and the other switches in switch structure 3 are open. Under that condition, the clock and definer signals generated in CGD unit 19A are sent through the delay lines 25A to the selector 23A and then to the other system components in system A. Similarly, the clock and definer signals generated in CGD unit 19B are sent through delay lines 25B to selector 23B for distribution to the other components of system B. The delay lines 25A and 25B, which may merely be extended traces on the printed circuit (not shown) of a back panel 6, are employed to ensure that the instantaneous phases of the clocks and definers generated in a single CGD unit (either 19A or 19B having been designated as master) is the same in both systems; i.e., physical separation is directly compensated.

Power confidence circuits 22A, 22B, may be usefully employed to monitor each power supply 21A, 21B to establish automatic switchover to independent operation in case one or the other of the power supplies fails which is one of the most likely failures in the redundant system.

Figure 5:
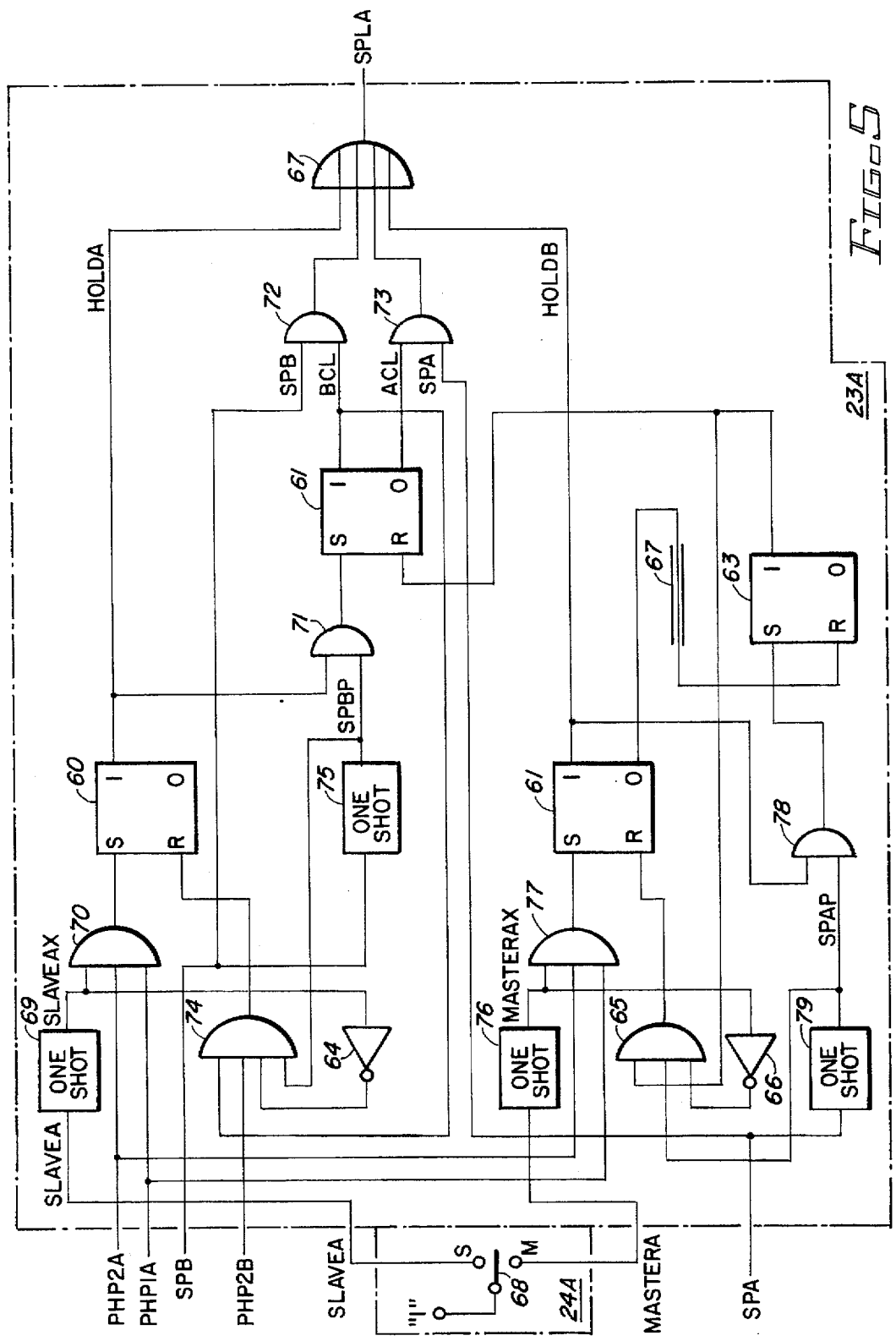
FIG. 5 is a detailed block diagram of a selector circuit incorporated into each clock and generation and distribution unit.

Attention is now directed to FIG. 5 which is a detailed logic diagram of the selector circuit 23B of CMU1 18B and also includes a simplified representation of master/slave mode select circuit 24B. Assume, as a convenient starting point, that the two systems making up the redundant system are operating, independently; i.e., each under control of its own, internally generated, clocks and definers. In this condition, the four rising leading edge triggered type flip-flops 60, 61, 62, 63, for reasons which will become more evident below, will all be reset such that their "1" outputs are all at the logic "0" level and their "0" outputs are therefore all at logic "1". It will be observed that the "0" output from the flip-flop 61 enables one input each of AND-gates 64, 65. (It will be understood that AND-gates 64, 65 are twenty-wide arrays.) The remaining inputs to AND-gates 64, 65 are driven, respectively, from PHP1B and PHP2B; i.e., the locally generated clock and definer. AND-gate 64 drives one input to twenty-wide OR-gate array 66 which therefore issues PHP1B as CLOCKB, the clock currently in use in system B. Similarly, AND-gate array 65 drives twenty-wide OR-gate array 67 which therefore issues PHP2B as DEFINERB for system B under these conditions. The clock and definer outputs from OR-gate arrays 66, 67 may conveniently be referred to as the local clock and definer signals.

Consider now a condition under which it is desired to establish the fully redundant system and that it has been determined that the CMU0 18A (FIG. 4) is to be the master clock and definer source; i.e., the clock and definer signals issued from CGD unit 19A are to be steered not only to the system components in system A 1, but also to the system components in system B 2. Since the CGD units 19A, 19B have been operating independently, it is necessary to rationalize the clock and definer signals generated by CGD unit 19A with the logic circuitry of system B under conditions which will ensure a smooth transition. This involves certain transitional handling of the clock and definer pulses from both systems A and B.

Under the exemplary conditions, it is desired to render system B to operate in the CMU1 18B slave mode. Referring also to the timing diagrams of FIGS. 6A–6L, switch 68 may therefore be momentarily actuated to the "S" position to place a logic "1" input signal on a one shot flip-flop 69. (It will be understood that the simplistic representation of the switch 68 is for purposes of illustration only, and the master/slave selection circuitry 24B may be as elaborate and automatic as is desired in a given redundant system.) One shot flip-flop 69 responds by issuing a logic "1" pulse SLAVEAX, having a predetermined period, which is employed as one input to an AND-gate 70. The predetermined time period of the pulse issued by the one shot flip-flop 69 should be about 1 ½ times the full cycle period of PHP2B, i.e., on the order of 25–30 nanoseconds in the example, in order to ensure safe operation of the succeeding step.

Second and third inputs to the AND-gate 70 are PHP1B and PHP2B. Thus, when (at T1) these two signals are both at logic "1" level and the logic "1" signal is present from the one shot flip-flop 69, AND-gate 70 will be fully enabled and issue a logic "1" pulse to set flip-flop 60. The "1" output from flip-flop 60 therefore switches to a logic "1" level ("hold") which is applied as another input to each of OR-gate arrays 66, 67. As a result, both CLOCKB and DEFFNERB are temporarily held at a logic "1" level.

In addition, the "1" output signal from the flip-flop 60 is applied as one input to an AND-gate 71 which has, as its other two inputs, a derivative of PHP1A (PHP1AP) and PHP2A. PHP1A and PHP2A being the clock and definer signals from system A 1 which are now also to be employed as the clock and definer signals in system B 2. PHP1AP is a short pulse from the output of one shot 74 that is driven by PHP1A. One shot 74 is configured to switch briefly to logic "1" at each leading edge of PHP1A.

Thus, on the first occasion (T2) after CLOCKB and DEFINERB have been placed into a hold condition during which PHP2A is at the logic "1" level and PHP1A has just switched to the logic "1" level, AND-gate 71 becomes fully enabled and issues an output signal which sets flip-flop 61. As a result, the "0" output ACL from flip-flop 61 switches to logic "0" which serves to disable AND-gate arrays 64, 65 to thereby lock out PHP1B and PHP2B. At the same time, the "1" output from flip-flop 61 switches to logic "1" (ACL) to enable first inputs to each of AND-gate arrays 72, 73. Consequently, PHP1A is coupled through AND-gate array 72 to OR-gate array 66, and PHP2A is coupled through AND-gate array 73 to OR-gate array 67. The logic "1" level from flip-flop 61 is also conveyed to the reset input of flip-flop 60, but slightly delayed through delay line 75 to prevent logic races. Thus, flip-flop 60 is reset at T3 which removes the logic "1" hold from the OR-gate arrays 66, 67, leaving PHP1A and PHP2A as the governing clock and definer signals in system B. It will therefore be understood that no disturbance was made to the logic circuitry throughout system B which are controlled by CLOCKB and DEFINERB other than a brief hold at a "safe" logic "1" level. Thereafter, system B 2, as well as system A 1, operates under control of the clock and definer signals generated in system A.

After this operation has completed, it is safe, with respect to the redundant system clock and definer signals, to close the other switches represented by the logic block 3 (FIGS. 1 and 4) to couple the two system busses 12A, 12B together for information interchange between system A 1 and system B 2, thereby establishing the redundant system for normal operation. Those skilled in the art will understand that further steps, unrelated to rationalization of the clock and definer signals which is the subject matter of the present invention, may be necessary before the switches coupling the two system busses are closed.

Consider now a condition in which system B 2 has been operating in the slave mode as described above and there is now some reason, such as the occurrence of a fault or a total system boot, which requires a change to independent operation. Referring also to the timing diagrams of FIGS. 7A–7L, actuation of the switch 68 to the "M" position triggers one shot flip-flop 76 which drives, for a predetermined period of on the order of 25–30 nanoseconds as before, one input to AND-gate 77. The other two inputs to AND-gate 77 are PHP1A and PHP2A. Thus, when PHP1A and PHP2A are both logic "1" (T1), AND-gate 77 becomes fully enabled and issues a logic "1" output to set flip-flop 62. The "1" output from flip-flop 62 switches to logic "1" which is connected as an input to OR-gate arrays 66 and 67 and thereby temporarily places a logic "1" hold condition on CLOCKB and DEFINERB. In addition, the "1" output from flip-flop 62 is connected to one input of another AND-gate 78 which has a derivative of PHP1B (PHP1BP) and PHP2B as its other two inputs. PHP1BP is a short pulse generated on the leading edge of PHP1B by one shot 75. Therefore, when PHP1BP and PHP2B are simultaneously at logic "1" levels (T2), AND-gate 78 becomes fully enabled to set flip-flop 63. The "1" output from flip-flop 63 is connected directly to the reset input of flip-flop 61 which is thereby reset. Consequently, the "0" output of flip-flop 61 (BCL) enables second inputs to the AND-gate arrays 64, 65 such that PHP1B and PHP2B are coupled, respectively, through the AND-gate arrays 64, 65 and to the OR-gate arrays 66, 67. In addition, the "0" output from flip-flop 61 is connected, through a short delay line 79, to the reset input of flip-flop 62 which therefore is reset shortly after the switch has been made to PHP1B and PHP2B to remove the "hold" from the OR-gate arrays 66, 67, thereby permitting the transfer of PHP1B and PHP2B to the system B components as CLOCKB and DEFINERB, respectively. The "0" output from flip-flop 62, which switches to logic "1" at this time, serves to reset flip-flop 63.

It will therefore be appreciated that the logic circuit illustrated in FIG. 5, which, of course, is replicated in selector 23A and master select 24A, of system A 1, serves to permit a smooth switch to either slave or master operating conditions without disturbing the logic circuitry of the CPUs, MUs, SCUs, and IOUs of the individual systems making up the redundant system.

Thus, while the principles of the invention have now been made clear in an illustrative embodiment, there will be immediately obvious to those skilled in the art many modifications of structure, arrangements, proportions, the elements, materials, and components, used in the practice of the invention which are particularly adapted for specific environments and operating requirements without departing from those principles.

What is claimed is:

1. A redundant computer system comprising:
    A) first and second computer systems, each said first and second computer system including:
        1) at least one central processing unit;
        2) a clock unit including:
            a) a clock generating and distribution unit adapted to generate a clock signal having a predetermined frequency and a definer signal having a frequency which is half said predetermined frequency, said clock generating and distribution unit further including time alignment means for delaying one of said clock and definer signals such that successive definer signal half cycles at logic "1" and logic "0" levels temporally bracket said clock signal full cycles at a first logic level, selected from logic "1" and logic "0" levels, to define successive clock pulses at said first logic level as first and second phases thereof,
   b) selection circuit means for selecting said clock and definer signals from only one of said first system and said second system for transfer to said central processing unit as local clock and definer signals; and
   c) bus means for conveying said local clock and definer signals to said central processor unit to coordinate the data manipulation operations therein;
B) means coupling said clock and definer signals generated in each of said first and second computer systems to said selection circuit means in each of said first and second computer systems; and
C) said selection circuit means in each said clock unit further including:
   1) clock mode selection means for selecting slave mode operation for the system in which said clock unit is resident;
   2) first hold means responsive to the selection of said slave mode of operation for invoking a hold on said local clock and definer signals at a first logic level when said local clock and definer signals are both at said first logic level;
   3) first sensing means for sensing when said clock and definer signals in said system in which said clock unit is not resident are both at said first logic level; and
   4) first switchover means responsive to said first sensing means sensing that said clock and definer signals in said system in which said clock unit is not resident are both at said first logic level to:
      i) release said hold invoked by said first hold means; and
      ii) issue said clock and definer signals in said system in which said clock unit is not resident as said local clock and definer signals.

2. The redundant computer system of claim 1 which further includes, in each of said first and second computer systems, at least one memory unit, at least one system control unit and at least one input/output unit and in which said bus means further conveys said local clock and definer signals thereto.

3. The redundant computer system of claim 1 in which said first logic level is logic "1".

4. The redundant computer system of claim 3 which further includes, in each of said first and second computer systems, at least one memory unit, at least one system control unit and at least one input/output unit and in which said bus means further conveys said local clock and definer signals thereto.

5. The redundant computer system of claim 1 which further includes:
A) clock mode operation means for selecting master mode operation for the system in which said clock unit is resident;
B) second hold means responsive to the selection of said master mode of operation for invoking a hold condition on said local clock and definer signals at a first logic level when said local clock and definer signals are both at said first logic level;

C) second sensing means for sensing when said local clock and definer signals are both at said first logic level; and
D) second switchover means responsive to said second sensing means sensing that said local clock and definer signals are both at said first logic level to:
   1) release said hold invoked by said second hold means; and
   2) issue said clock and definer signals in said system in which said clock unit is resident as said local clock and definer signals.

6. The redundant computer system of claim 5 which further includes, in each of said first and second computer systems, at least one memory unit, at least one system control unit and at least one input/output unit and in which said bus means further conveys said local clock and definer signals thereto.

7. The redundant computer system of claim 5 in which said first logic level is logic "1".

8. The redundant computer system of claim 7 which further includes, in each of said first and second computer systems, at least one memory unit, at least one system control unit and at least one input/output unit and in which said bus means further conveys said local clock and definer signals thereto.

9. A redundant computer system comprising:
A) first and second computer systems, each said first and second computer system including:
   1) at least one central processing unit, at least one memory unit, at least one system control unit and at least one input/output unit;
   2) a clock unit including:
      a) a clock generating and distribution unit adapted to generate a clock signal having a predetermined frequency and a definer signal having a frequency which is half said predetermined frequency, said clock generating and distribution unit further including time alignment means for delaying one of said clock and definer signals such that successive definer signal half cycles at logic "1" and logic "0" levels bracket said clock signal full cycles at a first logic level, selected from logic "1" and logic "0" levels, to temporally define successive clock pulses at said first logic level as first and second phases thereof;
      b) selection circuit means for selecting said clock and definer signals from only one of said first system and said second system for transfer to said central processing unit as local clock and definer signals; and
      c) clock bus means for conveying said local clock and definer signals to said central processor unit, said memory unit, said system control unit and said input/output unit to coordinate the data manipulation operations therein and therebetween;
B) a system bus coupling said central processor unit, said system control unit and said input/output unit together for information exchange therebetween;
C) means coupling said clock and definer signals generated in each of said first and second computer systems to said selection circuit means in each of said first and second computer systems; and
D) said selection circuit means in each said clock unit further including:
   1) clock mode selection means for selecting one of master and slave mode operation for the system in which said clock unit is resident;

2) first hold means responsive to the selection of said slave mode of operation for invoking a hold on said local clock and definer signals at a first logic level when said local clock and definer signals are both at said first logic level;

3) first sensing means for sensing when said clock and definer signals in said system in which said clock unit is not resident are both at said first logic level;

4) first switchover means responsive to said first sensing means sensing that said clock and definer signals in said system in which said clock unit is not resident are both at said first logic level to:
   i) release said hold invoked by said first hold means; and
   ii) issue said clock and definer signals in said system in which said clock unit is not resident as said local clock and definer signals;

5) second hold means responsive to the selection of said master mode of operation for invoking a hold on said local clock and definer signals at a first logic level when said local clock and definer signals are both at said first logic level;

6) second sensing means for sensing when said local clock and definer signals are both at said first logic level; and 7) second switchover means responsive to said second sensing means sensing that said local clock and definer signals are both at said first logic level to:
   1) release said hold invoked by said second hold means; and
   2) issue said clock and definer signals in said system in which said clock unit is resident as said local clock and definer signals; and E) switch means for coupling said system bus of said first system and said system bus of said second system for information exchange therebetween when one of said clock units is operating in the slave mode.

* * * * *